Dec. 7, 1965 S. L. LAWRENCE ETAL 3,221,674
HAY WAFERING APPARATUS
Filed June 12, 1963 2 Sheets-Sheet 1

INVENTOR.
Stanley L. Lawrence
Merle H. Peterson
BY
Barnard, McGlynn & Leising
ATTORNEYS

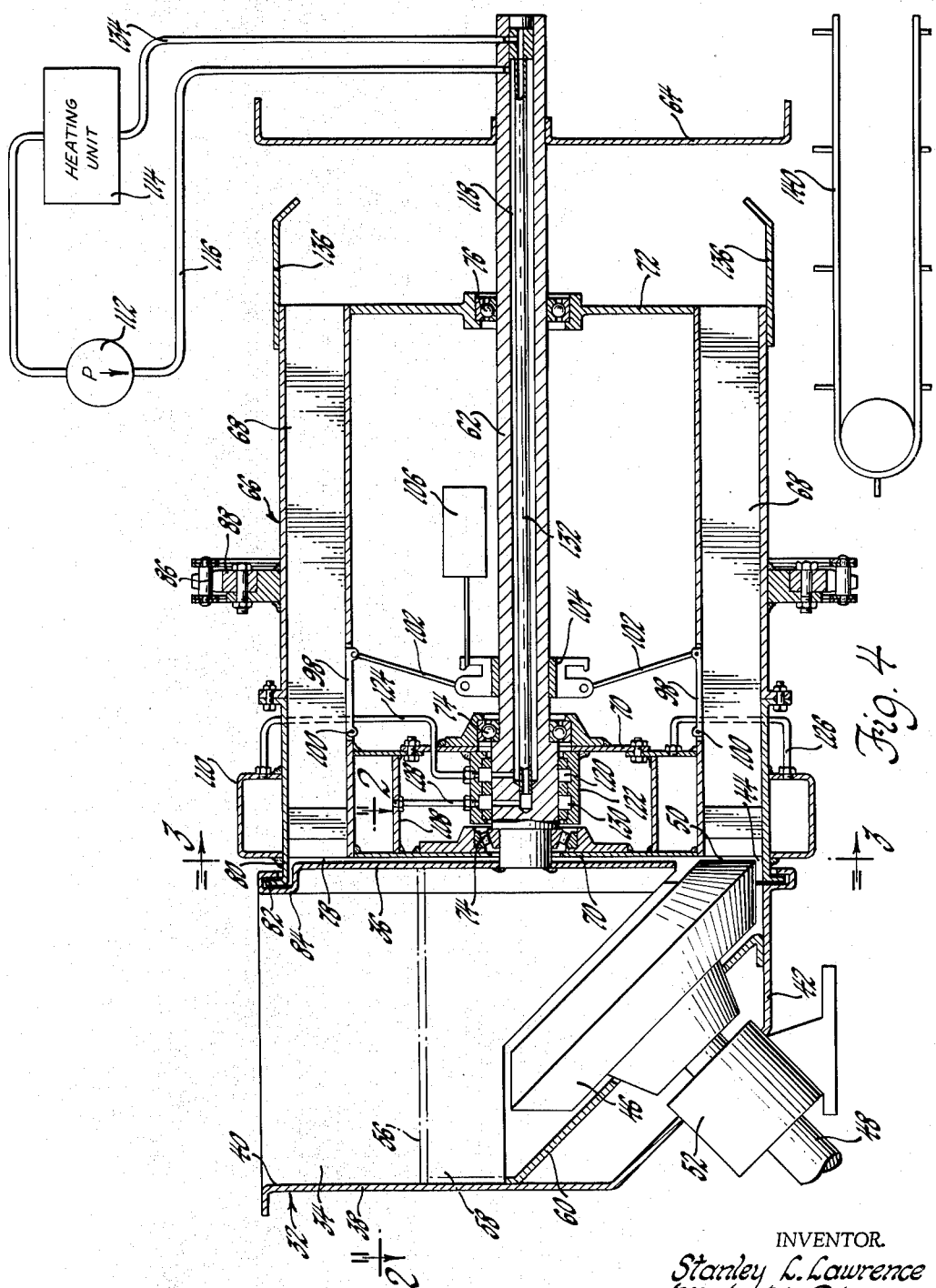

United States Patent Office 3,221,674
Patented Dec. 7, 1965

3,221,674
HAY WAFERING APPARATUS
Stanley L. Lawrence and Merle H. Peterson, Livonia, Mich., assignors to Massey-Ferguson Inc., Detroit, Mich., a corporation of Maryland
Filed June 12, 1963, Ser. No. 287,337
4 Claims. (Cl. 107—14)

This invention relates to an apparatus for producing hay wafers and, in particular, to an apparatus for field wafering forage crops into stable self-sustaining compressed hay wafers particularly characterized by relatively rotatable hay compression and die cell means in which the wafers are formed providing relatively uniform feeding of hay to be wafered and production of hay wafers.

In recent times, methods and apparatus have been devised for field wafering forage crops into hay wafers comprising means for supplying hay, preferably preconditioned or processed, finely chopped, mixed and blended hay from a windrow in a field, to a rotatable hay feeding and compression means for compressing hay into the entrance ends of an annular series of radially extending die cells communicating therewith to form a compressed extrusion of hay emerging from the exit ends of the respective die cells which may be broken into wafers of the desired length. As a result, as such an apparatus moves through a field of mown hay, continuous extrusions of compressed hay emerge from the exit ends of the respective die cells, and each extrusion is adapted to be engaged with an ejection means adjacent the exit ends of each of the die cells to break the respective extrusions of hay into wafers, which then preferably fall upon conveyor means for removal from the apparatus.

Due to the fact that the aforementioned die cells radiate outwardly from the aforementioned rotatable hay compression means, the over-all lengths of the respective die cells must necessarily be relatively short in order to provide an installation of practical size on the usual mobile frame carrying the wafering apparatus. Consequently, the length of any given extrusion of hay being compressed through and confined in a given die cell is necessarily limited due to the aforementioned considerations. On the other hand, it is desirable under certain circumstances to hold or confine a given extrusion of hay within a respective die cell for a long period of time, relatively speaking, to take advantage of the desirable effects of heat generated within the wafering apparatus to ultimately result in quite stable self-sustaining compressed hay wafers of high nutritional value and palatability to livestock. Often it is desirable under certain wafering conditions to apply controlled heating and cooling cycles to a given extrusion of hay being compressed through a given die cell for the purposes aforementioned. In any event, since such a wafering apparatus must be capable of producing finished wafers at a substantially high rate of production, the most practical way of exposing the hay extrusions to heat alone for a relatively long period, or heating and cooling cycles as the case may be, is to extend the lengths of the die cells so as to hold a given extrusion of hay under compression pressures for a longer time than is possible in the relatively short radiating die cells of the prior art as aforementioned. However, to extend the lengths of the prior radiating die cells to the extent required to achieve the foregoing purpose would result in an annular series of radiating die cells of inordinate diameter not capable of being contained as a practical matter on the mobile frame typically employed with such wafering apparatus for towing the latter through a field of mown hay.

In view of the foregoing considerations, the present invention is directed to an apparatus for wafering hay comprising means for supplying hay to be wafered to a hay compression means rotatable relative to an annular series of axially elongated parallel die cells each having axially spaced entrance and exit ends with such entrance ends thereof communicating with the aforementioned compression means whereby the latter may compress hay into and through the respective die cells and form extrusions of hay emerging therefrom adapted to be broken into hay wafers. In this regard, due to the parallel relationship of the respective die cells, the lengths of the latter may be quite great, relatively speaking, while providing a compact installation on the usual mobile frame of the apparatus.

More specifically in this regard, the apparatus of this invention is particularly characterized by the fact that the aforementioned die cells are horizontal and are mounted for rotation in unison about a horizontal axis whereby the respective entrance ends thereof travel in an annular or circular path contained within a common vertical plane, the aforementioned compression means including a compression roller rotatable about a fixed axis and in a fixed location within the annular or circular path of the entrance ends of the die cells, means being provided to rotate the die cells and the compression roller in the same direction and at different speeds to provide relatively uniform feed and compression of hay into and through the horizontally disposed die cells.

Yet more specifically, the invention is further characterized by means for varying the convergent cross sectional areas of at least a portion of the respective die cells simultaneously to a substantially uniform extent to substantially equally vary the resistance to flow of hay extrusions being compressed therethrough, thereby further contributing to the ultimate production of hay wafers at a substantially uniform rate.

In its more specific aspects, the present invention is directed to an apparatus of the general type aforementioned further characterized by means for heating a first portion of each of the die cells adjacent the entrance ends thereof to heat the contiguous surface of the extrusion of hay being compressed therethrough while pressure is being applied thereto, and means for cooling a second portion of each of the die cells between the first portion thereof and the exit ends thereof to set the shape of the hay within such second portions of the die cells for ultimate breaking of the extrusions of hay emerging from the exit ends of the die cells into hay wafers of the desired length.

In order to facilitate an understanding of the invention, a preferred embodiment thereof will now be described with reference to the accompanying drawing in which:

FIGURE 4 is an enlarged fragmentary sectional view, partially schematic, taken generally on the line 4—4 of FIGURE 1.

Figure 1:
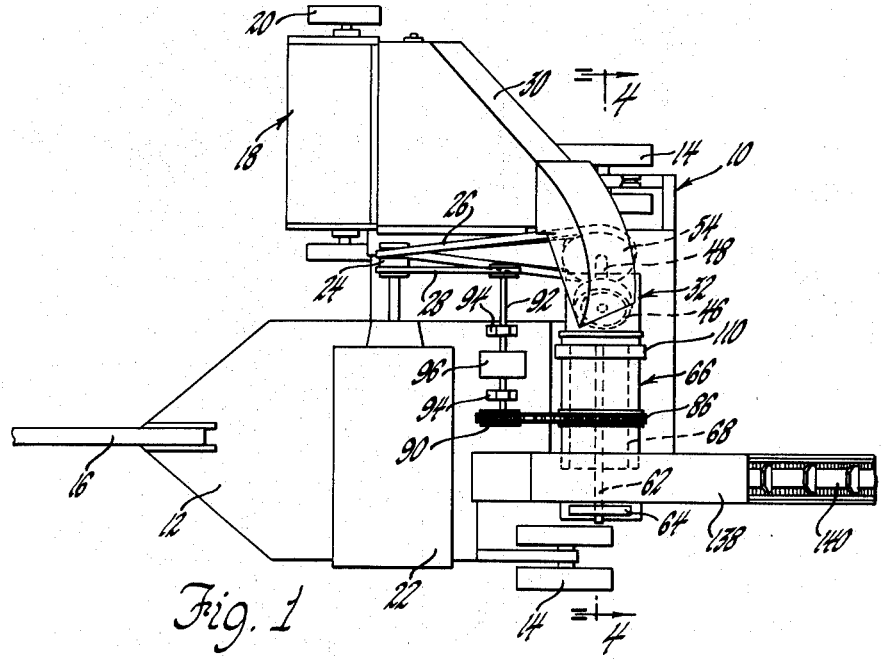
FIGURE 1 is a top plan view, partially schematic in nature, of a hay wafering apparatus illustrating a preferred embodiment of the invention.

Referring now to the drawings, the numeral 10 in FIGURE 1 generally indicates a hay wafering apparatus comprising a mobile frame 12 equipped with a ground-engaging wheel means 14 in the usual manner, and a drawbar 16 adapted to be hitched to a suitable prime mover, such as an agricultural tractor, for drawing the frame along a field of mown hay. A pick-up mechanism for mown hay in the field is indicated generally at 18, is equipped with ground-engaging wheels 20 in the usual manner and is suitably coupled in a conventional manner to the frame of the apparatus so as to be towed with the latter. A suitable power plant or engine 22 is mounted on the frame 12 and includes an output shaft mounting a pulley means 24 entraining the respective belt means 26 and 28 to drive various of the instrumentalities of the apparatus as will be pointed out hereinafter.

The apparatus aforedescribed is adapted to be towed along a field of mown or cut hay, preferably with the hay arranged in windrows to facilitate receipt and pick-up thereof by the pick-up mechanism 18 aforementioned in a substantially continuous fashion for supplying to wafering instrumentalities to be described. As the apparatus is towed along the field of hay, the hay in a given windrow is adapted to be picked up in the pick-up mechanism 18 which conventionally includes suitable means conventionally driven from the engine 22 through a pulley and belt system well known in the art and hence not shown, and to be directed thereby into the delivery chute 30 of the pick-up mechanism which delivers the hay to be wafered to a feed hopper indicated generally at 32 suitably fixably supported on the frame 12.

The feed hopper 32 is generally rectangular in transverse cross section and comprises the vertically extending laterally oppositely spaced side walls 34 and front and rear walls 36 and 38, respectively, forming at the upper end thereof an inlet opening 40 in communication with the aforementioned delivery chute 30, while the lower end of the front wall 36 terminates in vertically spaced relation to a forward portion of the bottom wall 42 of the hopper so as to define therebetween a laterally elongated opening 44 in communication with a die cell construction to be described. A single rotatable feed and compression roller 46 of relatively large diameter is suitably fixably secured to one end of a drive shaft 48 within the lower end of the hopper 32, and includes a continuous annular roller surface 50 disposed in a vertical plane and projecting through the aforementioned opening 44. The drive shaft 48 is mounted for rotation within suitable bearings 52 so that the axis of rotation thereof extends at an angle of approximately 45° with respect to the horizontal and the vertical plane of the roller surface 50. The other end of the shaft is suitably secured to the pulley or fly wheel 54 which is drivingly connected for rotation to the power plant or engine 22 by the aforementioned belt means 26.

Figure 2:
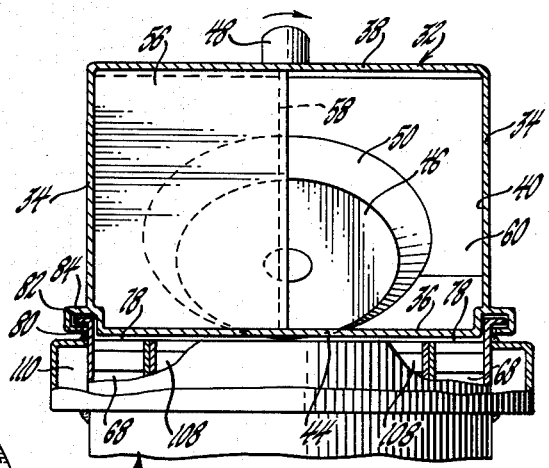
FIGURE 2 is a fragmentary view, partly in section and partly broken away to illustrate certain details, taken along a line 2—2 of FIGURE 4.

The feed hopper further includes a horizontal shield or plate member 56 suitably mounted between the inlet 40 of the hopper and the roller 46 and extending between the front and rear walls 36 and 38, respectively, of the latter, and from one side wall 34, toward the other side wall thereof but terminating in an edge disposed in a vertical plane containing the axis of rotation of the drive shaft 48 as will be apparent from FIGURE 2. In addition, another shield or plate member 58 is suitably fixed to and depends from the aforementioned terminal edge portion of the horizontal plate or shield member 56 and terminates in an edge portion closely spaced to the roller 46 and the roller surface 50 thereof remote from the aforementioned hopper inlet 40. Another plate member extends between side walls 34 and 60 and is suitably secured to and is inclined forwardly and downwardly from the rear wall 38 to the bottom wall 42, and embraces the hub of the roller 46 closely adjacent to the base of the latter. Thus, the plate or shield members 56 and 58 shield or mask the roller to one side of a vertical plane through the axis of rotation of the latter, whereby substantially all hay delivered into the inlet 40 of the hopper must pass to the other unshielded side or the right side thereof as viewed in FIGURE 2. Furthermore, such hay tends to flow downwardly along inclined plate member 60 toward the aforementioned opening 44 in the feed hopper communicating with the die cell construction to be described, and between the latter and the rotating feed and compression roller 46.

An axially elongated horizontal and stationary support shaft 62 has one end portion thereof suitably fixedly mounted within the front wall 36 of the hopper and the other end portion thereof mounted on a fixed support frame 64 suitably secured on the mobile frame 12 of the apparatus. The axis of the shaft 62 is contained in the same vertical plane as the axis of rotation of the roller drive shaft 48.

The rotatable die cell construction 66 comprises an annular or circumferentially spaced series of adjacent axially elongated parallel die cells 68 of suitable cross sectional configuration, herein shown to be rectangular in nature, which are suitably fixedly mounted relative to each other and equidistantly from the axis of support shaft 62 as by means of a suitable number of axially spaced wall or bracing members 70 and 72 respectively located adjacent the entrance ends thereof, and the wall or bracing members 70 adjacent the entrance and exit ends of the die cells. Suitable bearing means 74 and 76 respectively associated with the wall or bracing members 70 and 72 support the die cell construction for rotation about the axis of the support shaft 62 so that the respective die cells 68, and particularly the entrance ends thereof defined between an annular or circumferentially spaced series of die points having the knife edges 78, travel in an annular or circular path about the axis of rotation of the shaft 62 immediately adjacent but slightly spaced from the annular or circular path of rotation of the roller surface 50.

An axially extending annular skirt or shroud 80 includes a continuous annular flange 82 guidably seated within a cooperating continuous annular track 84 provided about and adjacent the front wall 36 of the feed hopper 32. Thus, as the entrance ends of successive ones of the die cells 68 rotate in the annular path aforementioned and successively past the opening 44 in the feed hopper while the roller surface 50 rotates in the latter, hay delivered to the hopper is fed from the unshielded side of the latter and to the left as viewed in FIGURE 2 between the surface 50 of the roller and the entrance ends of the die cells rotating opposite thereto at any given time, to lay such hay upon and across the knife edges 78 of the die points and the entrance ends of the respective successive die cells resulting in the roller surface compressing the hay, forcing it past the knife edges and compacting such day into and through the respective die cells upon successive rotative passes thereof.

The die cell construction 66 is adapted to be rotated as a unit about the axis of the shaft 62 by means of a drive chain 86 entrained about a sprocket 88 suitably secured to the die cell construction and a drive sprocket 90 secured to one end of a drive train 92 suitably mounted in the bearings 94 on the frame 12 and mounting a pulley at the other end thereof entraining the aforedescribed belt means 28 to receive motive power from the power plant or engine 22. As indicated schematically in FIGURE 1, the aforementioned drive train 92 may include, as desired or required, reduction gearing indicated schematically at 96 to provide the desired speed of rotation of the die cell construction 66.

Figure 3:
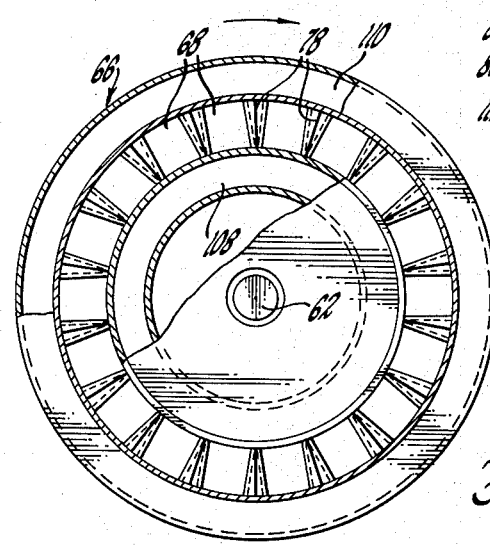
FIGURE 3 is a view partly in section and partly broken away to illustrate certain details, taken on line 3—3 of FIGURE 4.

At this juncture, it may be noted that the drive shaft 48 and hence, the roller 46 are driven in the same direction as the die cell construction 66 as indicated by the arrows in FIGURES 2 and 3, and preferably with the speed of rotation of the roller exceeding that of the die cell construction. For example, the speed of rotation of the drive shaft 48 may be in the order of 500 r.p.m. while that of the die cell construction may be 50 r.p.m. Thus, as the frame 12 travels through a field of mown hay which is picked up and delivered to the hopper 32 as aforementioned such hay is fed continuously by the roller 46 and is laid across the knife edges 78 of the die points and the entrance ends of the respective die cells 68 by the roller surface 50, which then compress the hay, force it past the knife edges and compress it into and through the respective die cells upon successive rotative passes thereof.

A wall member 98 is hingedly mounted as indicated at 100 in a portion of the length of each of the respective die cells 68 and is operatively hingedly connected by means of a link 102 to a common control member in the form of a collar 104 selectively axially shiftable along the support shaft 62 by a suitable control means indicated schematically at 106, which control means may be manually operable, operable remotely under hydraulic pressure or electrical actuation of the like. Due to the equidistant spacing of the control member or collar 104 from the respective wall members 98 and the fact that the links 102 are of equal length, shifting of the control member or collar to a given selected position along the length of the shaft 62 results in hinging the wall members 98 simultaneously and to an equal extent, thereby providing a means for varying the convergent cross sectional areas of the associated portions of the respective die cells simultaneously and to a substantially uniform extent to substantially equally vary the resistance to flow of hay being compressed therethrough. Thus the wall members 98 are shown in a full open flow position in FIGURE 4 of the drawings and will be hinged radially outwardly to decrease the cross sectional areas of the associated die cells upon shifting the control member or collar 104 to the right in FIGURE 3 of the drawings as will be readily apparent and for the purposes aforementioned.

The radially inner and outer concentric annular fluid manifold 108 and 110, respectively, extend circumferentially about and embrace a first relatively short axially extending portion of the entire axial lengths of the respective die cells 68 immediately adjacent the entrance ends thereof, and are adapted to have a heated fluid circulated therethrough for the purpose of heating the contiguous surface of an extrusion of hay confined within the respective die cells and being compressed therethrough at any given time. More specifically, a suitable pump as indicated at 112 is adapted to draw heated fluid from the heating unit and supply such fluid through a conduit 116 to one end of an axial passage 118 extending through the fixed support shaft 62 and terminating in a radial port communicating with the annular manifold 120 of a housing 122 sealingly embracing the shaft 62 and suitably fixed to one or the other or both of the wall or bracing members 70 of the die cell construction 66 for rotation with the latter. Fluid so communicated to the manifold 120 is further conducted through the conduit or conduits 124 to the outer manifold 110 from whence it can circulate to the inner manifold 108 by the conduit or conduits 126 and from the inner manifold through the conduit or conduits 128 to another annular manifold 130 in the housing 122. The manifold 130 communicates through another radial port in shaft 62 with a tubular conduit 132 disposed within the axial passage 118 and communicating through a radial port at its other end with the conduit 134 which returns fluid to the heating unit 114.

Thus the extrusions of hay compressed through the first portions of the die cells 68 adjacent the entrance ends thereof have their surfaces contiguous to the surfaces of the die cells heated by the heated fluid in the manifolds 108 and 110 so as to become at least partially plasticized to facilitate compression thereof, the hay extrusions being successively forced axially through the die cells into the longer second portions thereof downstream from the heated manifolds whereby air at ambient temperatures cool the walls of the die cells and the contiguous surfaces of the hay confined therein to cause the hay to set in shape. Since the heating portions of the die cells are considerably shorter in length than the air cooled portions thereof, it will be readily apparent that extrusions of hay being compacted through the die cells are held for a shorter period of time under heat than under the cooling influence of air, the particular heating and cooling periods being selected as required or desired as a function of the lengths of the die cells for any given speed of rotation of the compression roller 46 and the die cell construction 66.

As hay is so compressed and compacted through the die cells, extrusions of hay of substantially uniform quality, constituents, shape and density are formed which emerge from the exit ends of the die cells for engagement with ejection plates 136 projecting axially beyond the exit ends of the respective die cells and obliquely over the axes of the latter to cause the extrusions of hay to bend and break successively and continuously into wafers of substantially uniform length which drop into an enlarged housing or shroud 138 as illustrated in FIGURE 1 so as to fall upon an elevator type conveyor 140 for removal from the apparatus, preferably into a trailing conveyance.

In view of the foregoing description, it will now be appreciated that the present invention permits the practical use of die cells of considerably longer length than heretofore possible and, due to the fact that the barrellike cluster of die cells 68 rotates relative to the compression roller 46, a relatively uniform rate of feed and compression of hay through the die cell construction results. In addition, the respective cross sectional areas of a portion of the respective die cells may be simultaneously and substantially equally varied for the purposes aforedescribed due to selective shifting of the single control member or collar 104.

At this juncture, it may be noted that the longer second portions of the respective die cells 68 need not consist of a completely enclosed wall construction for conduction of cooling ambient air therethrough to the contiguous surfaces of extrusions of hay confined therein. For example, such portions of the die cells may include a suitable number of spaced apertures or comprise rectangularly spaced rods to confine the extrusions of hay, thereby permitting cooling air to be applied partially or substantially wholly directly to the surfaces of the hay extrusions.

The embodiments of the invention in which an exclusive property or privilege is claimed are defined as follows:

1. An apparatus for making compressed hay wafers comprising a support shaft, an annular series of relatively fixed axially elongated die cells extending parallel to each other and said support shaft and each having axially spaced entrance and exit ends, means mounting said die cells for rotation in unison about said support shaft whereby said entrance ends thereof travel in an annular path about said support shaft, feed hopper means communicating with said entrance ends of said die cells, a hay feeding compression roller mounted within said feed hopper means for rotation about a fixed axis and including a roller surface immediately adjacent to and rotatable at a fixed location within said annular path of said entrance ends of said die cells as the latter rotate, means for rotating said roller and said die cells to feed and compress hay from said feed hopper means into and through said die cells, annular fluid manifolding interconnecting a first portion of each of said die cells adjacent the entrance ends thereof to heat the contiguous surface of hay confined therein, a source of heated fluid, means for circulating said fluid through said support shaft and said manifolding, and means for cooling a second portion of each of said die cells extending between said first portion and exit end thereof to cool the contiguous surface of hay confined therein.

2. An apparatus for making compressed hay wafers comprising an annular series of relatively fixed parallel die cells each having spaced entrance and exit ends, said die cells being rotatable in unison about an axis parallel to and substantially equidistantly spaced from the respective axes of said die cells whereby said entrance ends thereof travel in an annular path about said axis of rotation, feed hopper means communicating with said entrance ends of said die cells, a hay feeding and compression roller mounted within said feed hopper means for rotation about a fixed axis and including a roller surface immediately adjacent to and rotatable in a fixed location within said annular path of said entrance ends of said die cells, means for rotating said roller and said die cells to feed and compress hay from said feed hopper means into and through said die cells, said feed hopper means including an inlet to receive hay to be wafered disposed opposite from said roller, a first shield member disposed between said inlet and said roller and extending to one side of the latter from the axis of rotation thereof, and a second shield member extending between said first shield member and said roller in a plane containing the axis of rotation of the latter whereby said shield members coact to direct hay received through said inlet to the other side of said roller for feed and compression by said roller surface into said entrance ends of successive die cells as the latter rotate in said annular path.

3. An apparatus for making compressed hay wafers comprising a support shaft, an annular series of relatively fixed axially elongated die cells extending parallel to each other and said support shaft and each having axially spaced entrance and exit ends, means mounting said die cells for rotation in unison about said support shaft whereby said entrance ends thereof travel in an annular path about said support shaft, feed hopper means communicating with said entrance ends of said die cells, a hay feeding and compression roller mounted within said feed hopper means for rotation about a fixed axis and including a roller surface immediately adjacent to and rotatable at a fixed location within said annular path of said entrance ends of said die cells as the latter rotate, means for rotating said roller and said die cells to feed and compress hay from said feed hopper means into and through said die cells, a wall member hingedly mounted on each of said die cells and forming an internal contact surface thereof, a control member shiftable axially along said support shaft, linkage means interconnecting said control member and said respective wall members, and means operatively connected to said control member to control the position of the latter along said support shaft to adjust the positions of said wall members substantially simultaneously to vary the cross sectional areas of a portion of each of said die cells substantially equally and uniformly to vary the resistance to flow of hay being compressed therethrough.

4. An apparatus for making compressed hay wafers comprising a support shaft, an annular series of relatively fixed axially elongated die cells extending parallel to each other and said support shaft and each having axially spaced entrance and exit ends, means mounting said die cells for rotation in unison about said support shaft whereby said entrance ends thereof travel in an annular path about said support shaft, feed hopper means communicating with said entrance ends of said die cells, a hay feeding and compression roller mounted within said feed hopper means for rotation about a fixed axis and including a roller surface immediately adjacent to and rotatable at a fixed location within said annular path of said entrance ends of said die cells as the latter rotates, means for rotating said roller and said die cells to feed and compress hay from said feed hopper means into and through said die cells, means including annular fluid manifolding interconnecting a first portion of each of said die cells adjacent the entrance ends thereof to heat the contiguous surface of the hay confined therein, and means for cooling a second portion of each of said die cells extending between said first portion and exit end thereof to cool the contiguous surface of hay confined therein, the lengths of said first portions of said respective die cells being less than the lengths of said second portions thereof, whereby the surfaces of hay compressed through said respective die cells is heated for a shorter period of time than they are cooled.

References Cited by the Examiner

UNITED STATES PATENTS

| | | | |
|---|---|---|---|
| 1,467,883 | 9/1923 | Sizer | 107—8.35 |
| 1,490,162 | 4/1924 | Dow | 107—8.35 |
| 1,994,371 | 3/1935 | Sizer | 107—8.35 |
| 2,020,510 | 11/1935 | Meakin | 107—8.35 |
| 2,144,054 | 1/1939 | Hall | 107—8.35 |
| 2,958,900 | 11/1960 | Meakin | 107—14 X |
| 3,016,026 | 1/1962 | Sorensen | 107—14 |

FOREIGN PATENTS

| | | |
|---|---|---|
| 613,028 | 5/1935 | Germany. |
| 691,867 | 5/1953 | Great Britain. |

WALTER A. SCHEEL, *Primary Examiner.*